(12) United States Patent
Makhotin et al.

(10) Patent No.: US 10,223,694 B2
(45) Date of Patent: Mar. 5, 2019

(54) MOBILE PAYMENT APPLICATION PROVISIONING AND PERSONALIZATION ON A MOBILE DEVICE

(71) Applicant: Visa International Service Association, Foster City, CA (US)

(72) Inventors: Oleg Makhotin, Castro Valley, CA (US); Hao Ngo, San Jose, CA (US); Christian Aabye, Foster City, CA (US); Kiushan Pirzadeh, Foster City, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 642 days.

(21) Appl. No.: 14/481,785

(22) Filed: Sep. 9, 2014

(65) Prior Publication Data
US 2015/0073996 A1    Mar. 12, 2015

Related U.S. Application Data

(60) Provisional application No. 61/876,220, filed on Sep. 10, 2013.

(51) Int. Cl.
*G06Q 20/00* (2012.01)
*G06Q 20/38* (2012.01)
(Continued)

(52) U.S. Cl.
CPC ......... *G06Q 20/3829* (2013.01); *G06Q 20/02* (2013.01); *G06Q 20/325* (2013.01);
(Continued)

(58) Field of Classification Search
CPC ................................................. G06Q 20/322
(Continued)

(56) References Cited

U.S. PATENT DOCUMENTS 8,196,131 B1   6/2012   Von Behren et al.
8,352,749 B2   1/2013   Von Behren et al.
(Continued)

OTHER PUBLICATIONS

International Search Report and the Written Opinion of the International Searching Authority, dated Dec. 17, 2014, International Application No. PCT/US2014/054846 (13 pages).

*Primary Examiner* — Chinedu C Agwumezie
(74) *Attorney, Agent, or Firm* — Kilpatrick Townsend & Stockton LLP

(57) ABSTRACT

Embodiments of the present invention are directed to systems and methods for providing a central entity that can provision mobile payment applications on mobile communication devices and personalize the mobile payment applications with consumer and account information. The personalization of the mobile payment application on the mobile communication device may include provisioning a payment account on the mobile payment application. The central entity may provision the account on the mobile payment application without interacting with the issuer during the provisioning of the account. The central entity may provision the account on the mobile communication device by decrypting, using a secure element key, encrypted payment account information received from the mobile communication device. The payment account information may be encrypted by a secure element of the mobile communication device using the same secure element key.

17 Claims, 7 Drawing Sheets

(51) Int. Cl.
*G06Q 20/02* (2012.01)
*G06Q 20/32* (2012.01)
*G06Q 20/34* (2012.01)

(52) U.S. Cl.
CPC ..... *G06Q 20/3227* (2013.01); *G06Q 20/3278* (2013.01); *G06Q 20/354* (2013.01); *G06Q 20/3552* (2013.01)

(58) Field of Classification Search
USPC .............................................. 705/75, 78, 79
See application file for complete search history.

(56) References Cited

U.S. PATENT DOCUMENTS

| | | | | |
|---|---|---|---|---|
| 8,706,588 | B1* | 4/2014 | Zhu | G06Q 20/32 705/35 |
| 2007/0294178 | A1 | 12/2007 | Pinder et al. | |
| 2009/0164322 | A1 | 6/2009 | Khan et al. | |
| 2010/0180327 | A1 | 7/2010 | Sheets et al. | |
| 2011/0078081 | A1 | 3/2011 | Pirzadeh et al. | |
| 2012/0078735 | A1* | 3/2012 | Bauer | G06Q 20/20 705/16 |
| 2012/0095852 | A1* | 4/2012 | Bauer | G06Q 20/105 705/16 |
| 2012/0300932 | A1* | 11/2012 | Cambridge | H04L 9/3234 380/270 |
| 2012/0303961 | A1 | 11/2012 | Kean et al. | |
| 2013/0024383 | A1* | 1/2013 | Kannappan | G06Q 20/40 705/71 |
| 2013/0041830 | A1* | 2/2013 | Singh | G06Q 20/12 705/65 |
| 2013/0262317 | A1 | 10/2013 | Collinge et al. | |
| 2014/0101034 | A1* | 4/2014 | Tanner | G06Q 20/10 705/39 |
| 2014/0149294 | A1 | 5/2014 | Leevendig et al. | |

* cited by examiner

400

```
┌─────────────────────────────────────────────────────────────────┐
│ RECEIVING A PROVISIONING REQUEST FOR PROVISIONING AN ACCOUNT    │
│ ON A MOBILE DEVICE, THE PROVISIONING REQUEST INCLUDING PAYMENT  │
│ ACCOUNT INFORMATION ENCRYPTED USING A FIRST SECURE ELEMENT KEY  │
│                              402                                │
└─────────────────────────────────────────────────────────────────┘
                                 ↓
┌─────────────────────────────────────────────────────────────────┐
│ DECRYPTING THE ENCRYPTED PAYMENT ACCOUNT INFORMATION USING      │
│ A SECOND SECURE ELEMENT KEY OF THE SECURE ELEMENT KEY PAIR      │
│                              404                                │
└─────────────────────────────────────────────────────────────────┘
                                 ↓
┌─────────────────────────────────────────────────────────────────┐
│ VALIDATING THE MOBILE DEVICE USING THE SECOND SECURE ELEMENT    │
│           KEY OF THE SECURE ELEMENT KEY PAIR                    │
│                              406                                │
└─────────────────────────────────────────────────────────────────┘
                                 ↓
┌─────────────────────────────────────────────────────────────────┐
│ PROVISIONING THE ACCOUNT ON THE MOBILE DEVICE USING THE         │
│         DECRYPTED PAYMENT ACCOUNT INFORMATION                   │
│                              408                                │
└─────────────────────────────────────────────────────────────────┘
```

FIG. 4

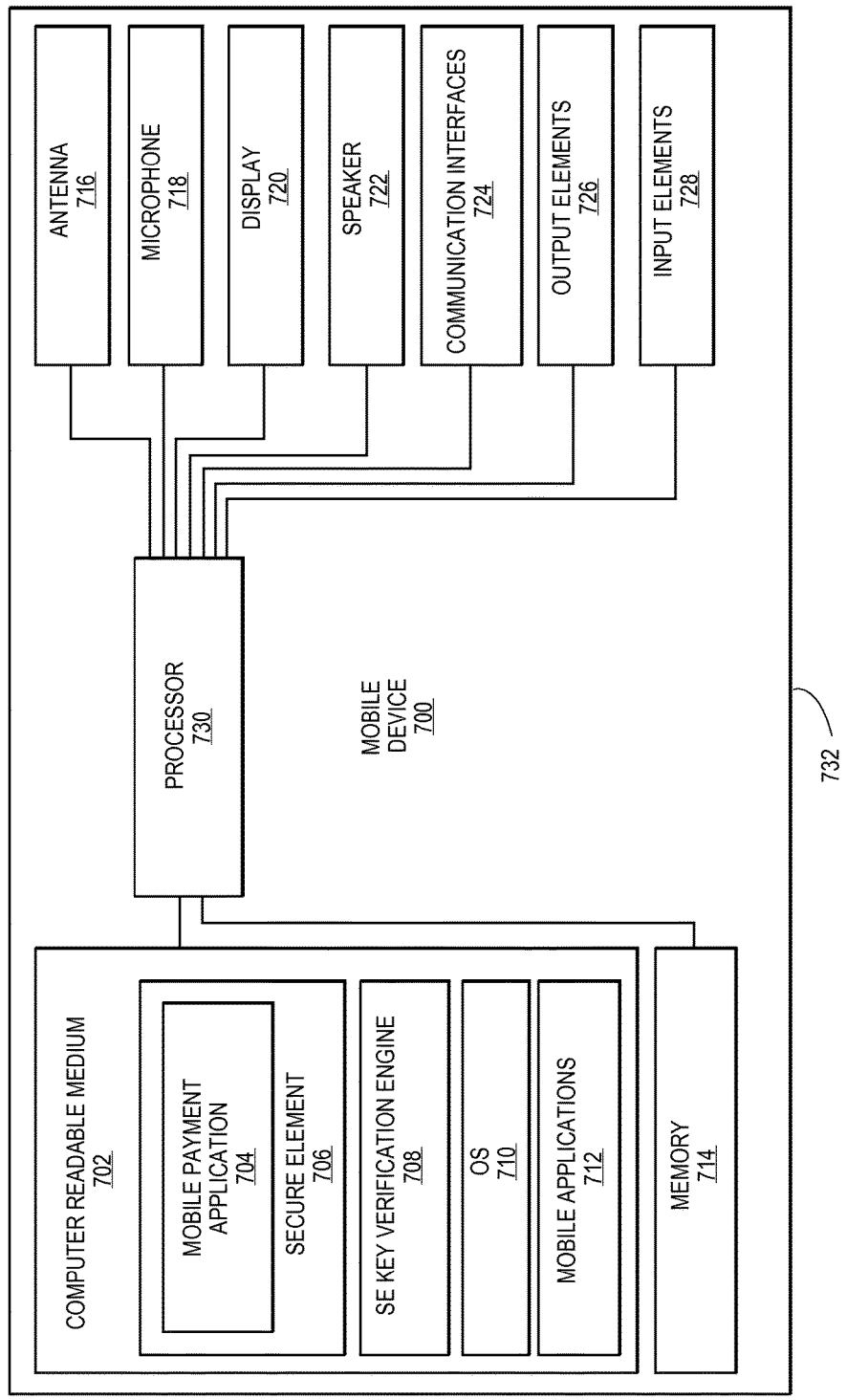

MOBILE PAYMENT APPLICATION PROVISIONING AND PERSONALIZATION ON A MOBILE DEVICE

CROSS-REFERENCES TO RELATED APPLICATIONS

This application claims benefit under 35 USC § 119(e) to U.S. Provisional Patent Application No. 61/876,220 filed Sep. 10, 2013 and entitled "Re-Activation Code", the disclosure of which is incorporated by reference herein in its entirety for all purposes.

BACKGROUND

In current mobile contactless transaction environments, a financial institution (e.g., an issuer) of a payment device has its own trusted service manager (TSM) in order to communicate with a secure element (SE) trusted service manager for provisioning an account associated with the payment device on a mobile communication device. The SE allows the mobile communication device to gain benefit of a near-field communication (NFC) reader, which are located at merchant locations for conducting contactless transactions. In the current mobile transaction industry, the TSM providers provide end-to-end solutions by connecting individual entities, each of which is subject to particular business arrangements and each of which communicates in a particular protocol.

Conventionally, a consumer wishing to provision an account on a mobile communication device needs to have his/her identity verified by the issuer of the account. Thus, the consumer contacts the issuer to provide personal information such as a primary account number (PAN), a card expiration date (CED), personal identification information such as name, date of birth, etc. Once the issuer verifies that the consumer is the approved user of the account, the issuer would send/give an account activation code to the user. The user then provides the account activation code to a payment processing network for provisioning the account on the mobile communication device. The payment processing network contacts the issuer to confirm the account activation code and that the user is already authorized by the issuer. This process is inefficient as it involves unnecessary communication between the payment processing network and the issuer during the provisioning of the account on the mobile communication device.

Moreover, in order to provision the account on the mobile communication device, a mobile payment application must be first provisioned on the mobile communication device. Conventional systems use the above-mentioned TSM providers for provisioning and personalization of a mobile payment application on the mobile communication device. Interacting with third party TSM results in communication overhead and increases the risk of exposing sensitive account information to malicious parties.

Embodiments of the invention address these and other problems, individually and collectively.

BRIEF SUMMARY

Embodiments provide a central entity that can provision mobile payment applications on the mobile communication devices and personalize the mobile payment applications with consumer and account information. The provisioning of the mobile payment application on the mobile device may include providing (i.e. installing, loading) the mobile payment application on a secure element of the mobile device. The personalization of the mobile payment application on the mobile communication device may include provisioning (i.e. providing) a payment account on the mobile payment application. The provisioning of the payment account on the mobile payment application may associate the account with the mobile payment application.

The central entity may provision the account on the mobile payment application without interacting with the issuer during the provisioning of the account. The central entity may provision the account on the mobile communication device by decrypting, using a secure element key, encrypted payment account information received from the mobile communication device. The payment account information may have been encrypted by a secure element of the mobile communication device using the same secure element key. In some embodiments, the encrypted payment account information may include a primary account number and an account activation code.

In certain embodiments, a method is provided for provisioning an account on a mobile device is provided. A provisioning request for provisioning an account on a mobile device is received by a server computer. The provisioning request may include encrypted payment account information that is encrypted using a first secure element key associated with a security domain of a secure element provided on the mobile device. The first secure element key may be one of a secure element key pair. The secure element key pair may be unique to the secure element. The method further includes decrypting, by the server computer, the encrypted payment account information using a second secure element key of the secure element key pair. The mobile device may be validated, by the server computer, using the second secure element key of the secure element key pair. The method may also include provisioning, by the server computer, the account on the mobile device using the decrypted payment account information.

According to various embodiments, a secret key may be shared, by the server computer, with an issuer of the account prior to receiving the provisioning request. An account activation code for the account may be received, by the server computer. The account activation code is generated by the issuer of the account using the shared secret key. The method may continue by verifying that the account is pre-authorized by the issuer to be provisioned on the mobile device based on the account activation code, without communicating with the issuer of the account during the provisioning of the account on the mobile device. The account activation code may be validated by the server computer using the shared secret key.

In some embodiments, a system is provided for provisioning an account on a mobile device. The system may include a processor and a non-transitory computer readable medium coupled to the processor. The computer readable medium includes code, that when executed by the processor, causes the processor to receive a provisioning request for provisioning an account on a mobile device. The provisioning request may include encrypted payment account information that is encrypted using a first secure element key associated with a security domain of a secure element provided on the mobile device. The first secure element key may be one of a secure element key pair. The secure element key pair may be unique to the secure element. The code, when executed by the processor, further causes the processor to decrypt the encrypted payment account information using a second secure element key of the secure element key pair and validate the mobile device using the second secure element key of the secure element key pair. The code, when executed by the processor, also causes the processor to provision the account on the mobile device using the decrypted payment account information.

Various embodiments provide a method for a mobile device to encrypt payment account information using a first secure element key associated with a security domain of a secure element provided on the mobile device. The first secure element key may be one of a secure element key pair. The secure element key pair may be unique to the secure element. The method may include generating, by the mobile device, a provisioning request for provisioning an account on the mobile device. The provisioning request may include the encrypted payment account information. The provisioning request may be sent, by the mobile device to a server computer. The method may also include receiving, by the mobile device, a script provisioning the account on the mobile device. The script is generated by decrypting the encrypted payment account information using a second secure element key of the secure element key pair.

These and other embodiments of the invention are described in further detail below.

BRIEF DESCRIPTION OF THE DRAWINGS

FIG. 4 shows an exemplary process flowchart for a server computer to provision/personalize an account on a mobile device using a secure element key pair, according to an exemplary embodiment of the present invention.

FIG. 7 illustrates an exemplary mobile communication device capable of communicating with the system of FIG. 1.

DETAILED DESCRIPTION

Figure 1:
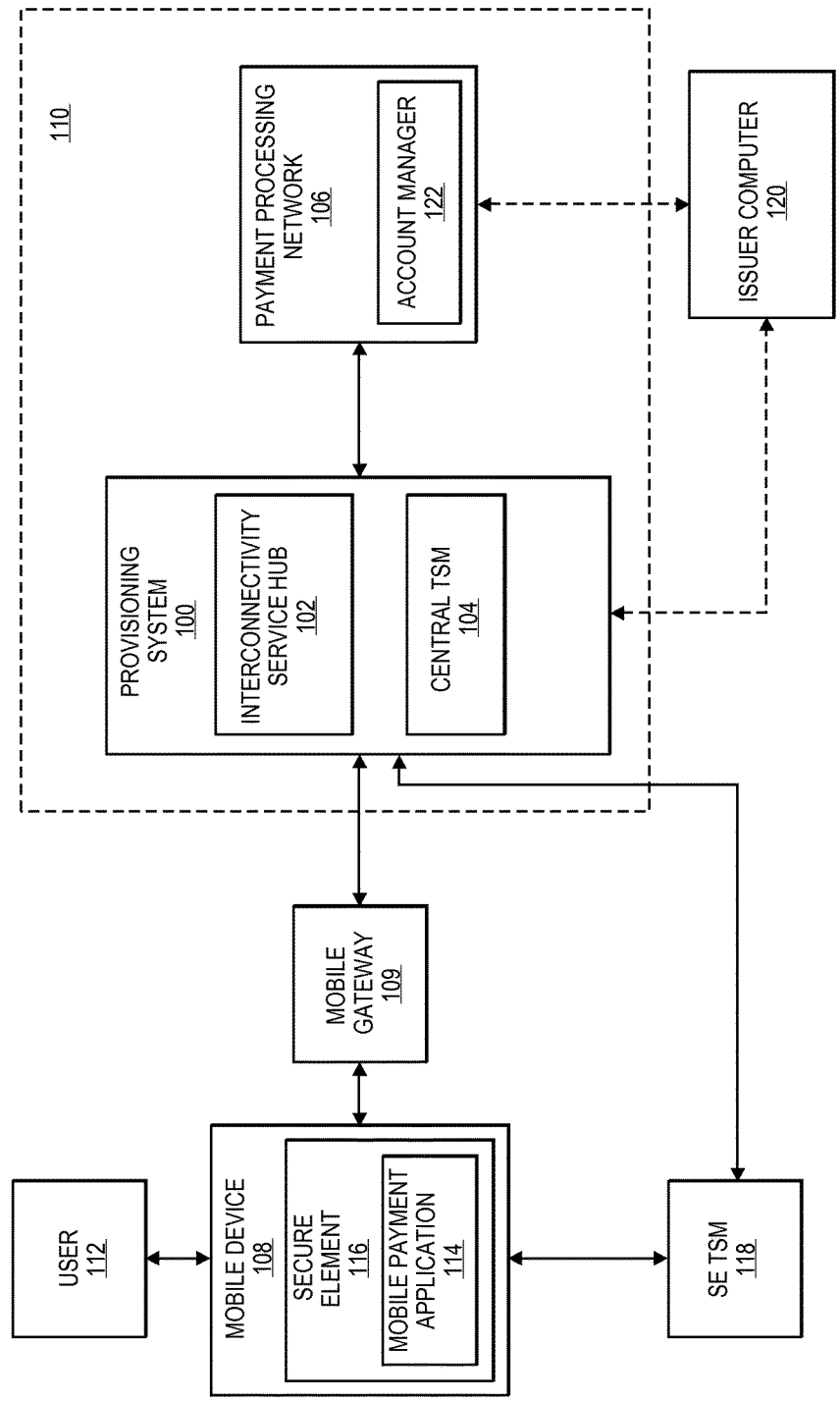
FIG. 1 a block diagram of a system for provisioning and personalizing a payment account application on a mobile device, according to an exemplary embodiment of the present invention.

Embodiments provide a central entity that can provision mobile payment applications on the mobile communication devices and personalize the mobile payment applications with consumer and account information. The provisioning of the mobile payment application on the mobile device may include providing (i.e. installing, loading) the mobile payment application on a secure element of the mobile device. The personalization of the mobile payment application on the mobile communication device may include provisioning (i.e. providing) a payment account on the mobile payment application. The provisioning of the payment account on the mobile payment application may associate the account with the mobile payment application.

The central entity may provision the account on the mobile payment application without interacting with the issuer during the provisioning of the account. The central entity may provision the account on the mobile communication device by decrypting, using a secure element key, encrypted payment account information received from the mobile communication device. The payment account information may be encrypted by a secure element of the mobile communication device using the same secure element key. In some embodiments, the encrypted payment account information may include a primary account number and an account activation code.

Prior to discussing the example embodiments of the invention, a further description of some terms can be provided for a better understanding of the invention.

A "trusted service manager" (TSM) can include a system that may be operated by any entity that forms a business agreement with another entity in order to manage a service on their behalf. For example, a TSM may include one or more servers that form a service platform managed by any entity offering services to support mobile financial services between an issuer and a mobile network operator, service provider, or other secure element owner in control of a secure element of a mobile communication device. A mobile network operator or secure element owner often creates a secure communication point through a TSM associated with the mobile network operator or service provider that manages and controls a secure element. Accordingly, a TSM associated with an issuer ("issuer trusted service manager") may communicate with a TSM associated with a secure element ("secure element trusted service manager") in order to communicate any specific request, action, command, or activity to be performed on a portion of a secure element.

The basic functionalities that may be provided by TSMs may depend on the type of TSM. For example, a secure element TSM may include a system responsible for managing secure element keys for installing and configuring a mobile payment application on a secure element using over-the-air (OTA) communications. Issuer TSMs may include a system responsible for activating and personalizing a mobile payment application with a consumer's payment or financial information. For example, upon receiving an activation request from an issuer TSM, a secure element TSM may provision (i.e. provide, install) the mobile application or mobile payment application onto the designated secure element within a mobile communication device using OTA communications. The secure element TSM may communicate with a trusted service manager application installed on the mobile communication device or directly with a secure element. The issuer TSM may also request that the secure element TSM activate, lock, or unlock a mobile payment application already installed on a secure element on the mobile communication device. Additionally, a secure element TSM or an issuer TSM may provide ongoing secure element platform management and support, as well as ongoing mobile payment application management and support.

A "central trusted service manager" may include a TSM that is associated with an interconnectivity services hub. The central trusted service manager may be physically separate but functionally coupled to the interconnectivity services hub or may be integrated with the interconnectivity services hub. The central trusted service manager may complete any data preparation or generation tasks that a typical trusted service manager may complete. Additionally, the central trusted service manager may communicate with other TSMs or may communicate directly with any other entity within the mobile contactless payment system. In some embodiments of the present invention, the central trusted service manager may be utilized to provide TSM duties for issuers that do not have an issuer TSM and do not otherwise prepare the application and provisioning data before sending a message to the interconnectivity services hub. Additionally, the central trusted service manager may comprise a life cycle management (LCM) module to perform maintenance and other functions on mobile payment applications, mobile applications, secure elements, or any other entity in the mobile contactless payment system. The central trusted service manager may also prepare application data or personalize payment applications using a common personalization scheme (CPS), as one of ordinary skill would recognize. Furthermore, the central trusted service manager may be capable of communicating directly with mobile communication devices through trusted service manager applications (or any other applications) using OTA communications module. An exemplary central trusted service manager is described in greater detail in a related application, U.S. patent application Ser. No. 13/713,938 filed on Dec. 13, 2012, titled "Integrated Mobile Trusted Service Manager, which is assigned to the same assignee as the present application, and the contents of which are incorporated by reference in their entirety for all purposes.

An "interconnectivity service system" or "hub" can include any central hub or switch that connects various entities in a mobile payment system to one another. The interconnectivity service system may be integrated with a central trusted service manager or may be electronically coupled to a central trusted service manager that may be capable of completing any number of services typically associated with trusted service managers on behalf of the hub or on behalf of any requesting entity communicating with the hub. The hub may be a server computer or a series of server computers that include various service modules. The service modules may include a key management module, a routing table module, a protocol adapter module, a mobile service module, and a reports module. The modules may be stored on a computer readable medium and each module may be accessed by the central trusted service manager while performing a trusted service manager service for any number of various entities such as a mobile wallet provider, an issuer or other service provider, and a secure element owner. The hub modules may also be capable of securely communicating between the aforementioned entities by communicating via various interface connections (i.e., interfaces), each of which may implement a different communication protocol. An exemplary interconnectivity service system is described in greater detail in a related application, U.S. patent application Ser. No. 13/713,938 filed on Dec. 13, 2012, titled "integrated mobile trusted servicer manager, the content of which is incorporated by reference in its entirety for all purposes, and which is assigned to the same assignee as the present application.

An "interface" may include any connection, electrical coupling, or other hardware or software solution for allowing communication between the hub and an entity in the mobile payment system. An interface may be configured for wireless communication, wired communication, or any other form of communication. The hub may comprise a plurality of interfaces where each interface implements a separate communication protocol. Interfaces may be uniform for certain types of entities that are communicating with the hub, or each interface between the hub and an entity may be customized for that particular entity. For example, an interface for a secure element trusted service manager may use a predetermined communication protocol that was established during an on-boarding process between the trusted service manager and the hub. However, as another example, every interface connection between an issuer and the hub may be uniform, using a predetermined issuer interface protocol. Furthermore, some interfaces may use the same general communication protocol standard or specification but the configuration options for the communication protocol standard may necessitate a customized interface for different entities, even though they are using the same general communication protocol.

A "mobile communication device" may include any device capable of communicating with another device over a communications network. For example, a mobile communication device may include cellular or wireless phones, smart phones, tablets, personal digital assistants (PDAs), pagers, portable computers, and the like.

A "mobile payment application" may be an application providing payment capabilities implemented within a mobile communication device. For example, the mobile payment application may be installed in a secure element chip within a NFC-enabled portable communication device. The mobile payment application may be installed within a designated area of the secure element that may be accessed with a particular secure element key or unique derived key (UDK) provided by the secure element or may be installed in another available area on the secure element. The mobile payment application provides the functionality to manage and maintain the consumer's payment information and support mobile payments. During a payment transaction, the mobile payment application may interact with an access device over a contactless interface to enable a mobile payment transaction. The mobile payment application may also support other modes of mobile payments, such as e-commerce, using the mobile communication device. The entity issuing the mobile payment application may be an issuer, mobile wallet provider, payment processing network, or other member of the mobile contactless payment system. The mobile payment application may also interface with an unsecured application or mobile application (MA) on a mobile communication device that allows a user to manage the mobile payment application, interact with a service provider, or otherwise interface with the contactless payment system.

A "mobile application" may be an application that operates on the mobile communication device. The mobile application may provide a user interface for consumer interaction (e.g., to enter and view information) with the mobile payment application and/or mobile wallet. The mobile application also communicates with the mobile payment application to retrieve and return information during the processing of any of a number of services offered to the consumer via the mobile communication device (e.g., completing a transaction, issuer update processing, etc.). Additionally, the mobile application can communicate with the mobile gateway to send and receive over-the-air (OTA) messages.

An "application" may be computer code or other data stored on a computer readable medium (e.g. memory element or secure element) that may be executable by a processor to complete a task. An "applet" can be a simplified application that may be programmed to perform a single or limited specific number of tasks.

"Application personalization information" may include application information related to a payment account that is used to provision a new mobile payment application. For example, application personalization information may identify a consumer's account at an issuer such that the consumer's account may be identified during a payment transaction. Exemplary application personalization information may include one or more of payment account holder name, social security number, address, contact information; payment account number, an expiration date associated with the payment account, etc. If a card (e.g. payment card, credit card, pre-paid card) is associated with the payment account, then the application personalization information may also include one or more of an expiration date of the card, a verification number of the card, an account activation code generated by the issuer of the card, etc.

A "secure element" may include any secure memory device such that the data contained on the secure element cannot easily be hacked, cracked, or obtained by an unauthorized entity. For example, the secure element may be an integrated circuit device that is implemented within a NFC-enabled mobile communication device. The secure element may contain embedded smart card-grade applications (e.g., payment, transport, etc.). The secure element may be used by the mobile communication device to host and store data and applications that require a high degree of security. For example, the secure element may be encrypted and may store payment account information, such as account numbers and credentials found in a mobile wallet application or mobile payment application. The secure element may be provided to the mobile communication device by the secure element owner, who may also be the mobile network operator (MNO), original equipment manufacturer (OEM), mobile device manufacturer (MDM), or any other suitable entity. Additionally, the secure element may be either embedded in the handset of the mobile communication device or in a subscriber identity module (SIM) card that may be removable from the mobile communication device. The secure element can also be included in an add-on device such as a micro-Secure Digital (microSD) card or the like.

A "secure element key" can be an encryption key that is used in order to communicate with a secure element. In some embodiments, a secure element key may be one of a secure element key pair. The secure element key pair may include symmetric or asymmetric secure element keys. The symmetric secure element keys may be 16 bytes long while the asymmetric secure element keys may be 256 bytes long. Exemplary symmetric secure element keys may include security domain secure channel keys, such as double length Data Encryption Standard (DES) keys used with Triple Data Encryption Standard (3DES) cryptography operation, or Advanced Encryption Standard (AES) keys of various length. Exemplary asymmetric secure element keys may include keys generated with RSA cryptosystem having a minimum of 1024 bits length or keys generated with Elliptic Curve Cryptography (ECC) having 256 bits length. The asymmetric keys may be used in the controlling authority security domain. In various embodiments, application-specific keys may be used to achieve the cryptographic operation if the application with the loaded keys is already available on the secure element.

The entity installing/provisioning the mobile payment application (typically a secure element TSM) may need a secure element key and/or a token to install and personalize the mobile payment application on the secure element. The secure element key may typically be determined and provided by the secure element owner or secure element issuer. However, the secure element key may generally be managed on the secure element issuer's behalf by a personalization bureau or secure element trusted service manager. That is, these secure element keys may be provided by the secure element owner to a secure element TSM. The secure element key may be used to ensure that the secure element is highly secure and that only entities that have the permission of the secure element owner or secure element trusted service manager may communicate or access data on the secure element.

For example, during the provisioning of a mobile payment application, a central TSM may initiate a provisioning process by sending a request to create a supplementary security domain (SSD) including application personalization information (e.g. a UDK key or mobile application identifier to a secure element TSM through the hub) to a secure element TSM. The secure element TSM may then implement two different processes for provisioning a mobile payment application on a secure element. First, using a simple mode, the secure element trusted service manager may create the security domain for the issuer and provision the mobile payment application to the secure element. The secure element trusted service manager may then send the security domain owner information (including a secure element key) back to the central TSM such that the TSM can access or manage the security domain (and corresponding provisioned mobile payment application) of the secure element directly. Accordingly, the mobile payment application may be loaded by the secure element TSM. In embodiments of the present invention, these messages may be passed through an interconnectivity service hub.

Alternatively, in delegated or authorized mode, the secure element TSM may create the security domain on the secure element, may generate a secure element key for the security domain, and may send the secure element key and other information to the central TSM. However, the secure element TSM may not provision the mobile payment application. Accordingly, the central TSM may provision and personalize the mobile payment application directly by communicating with the secure element using the received secure element key through over-the-air (OTA) communication messages.

In some embodiments, the secure element TSM may not provide a top level master secure element key, instead only provide a secure element key corresponding to a supplementary issuer domain where the mobile payment application may be installed (e.g. a temporary key). The temporary key may be generated during manufacturing of the secure element and may stay in the secure element as long as the secure element is empty, i.e. not storing any valuable or sensitive data. Alternatively, the temporary key may be generated and installed with the creation of a security domain or a specific application on the secure element. Before sensitive data, such as personal account information, is loaded to the secure element, the temporary key may be replaced with a permanent key. The permanent key enables the provider of the permanent key to own and/or manage the security domain and the data stored in the security domain.

According to various embodiments, the secure element trusted service manager may create a secure element key for the central TSM and may send the secure element key to the central TSM through the hub. After, the central TSM may take ownership of the security domain and replace the secure element key with a new key (e.g., permanent secure element key) to take ownership of the security domain (e.g., the secure element TSM may no longer control the domain of the secure element that has been provided to the hub) as the secure element TSM no longer has access to the secure element key (e.g., final secure element key). However, the secure element TSM may still revoke access to the supplementary security domain (e.g., delete the security domain from the secure element) using the master secure element key.

A "secure element owner" or "secure element issuer" may include any entity that owns, issues, provides, or controls a secure element. Secure element owners are typically mobile network operators that distribute mobile communication devices containing secure elements to consumers. However, secure element owners may also include original equipment manufacturers, mobile device manufacturers, near-field communications platform developers (e.g., a secure element NFC chip manufacturer), or any other entity that develops, manufacturers, or otherwise interacts with a mobile communication device.

Secure element owners can provide other entities involved in the contactless mobile payment ecosystem access to their secure element to allow them to load and manage mobile and digital wallets, mobile payment applications, or any other mobile application that benefits from an additional layer of security on a mobile communication device. Accordingly, a secure element owner may control access to the secure element in a mobile communication device. Likewise, a secure element trusted service manager may control access to a secure element on behalf of the secure element owner.

An "issuer" can include a payment account issuer. During provisioning, issuers (and issuer trusted service managers) may ensure that personalization information is provided to wallet providers to ensure that mobile or digital wallets are properly configured to allow consumer purchases using mobile payment applications on the secure element.

A "mobile gateway" can include a server computer or a series of server computers that are configured to communicate with mobile communication devices using over-the-air (OTA) messages. The mobile gateway may allow mobile communication devices to access services from an issuer via the hub, such as, for example, issuer updates. Additionally, the mobile gateway may allow mobile payment application issuers to communicate with the mobile communication devices of consumers. The mobile gateway may provide a secure channel over which information can be transmitted securely through the mobile communication device, over the mobile network, and/or over the Internet. Mobile gateways may be implemented by issuers, acquirers, third-party services providers, or trusted service managers and may be integrated with the interconnectivity services hub such that any entity coupled to the hub may be connected to the mobile gateway and subsequently, a mobile communication device.

In order for a mobile gateway to communicate with a mobile payment application, a unique derived key (UDK) may be shared between the mobile gateway and the mobile payment application. Accordingly, in some embodiments, a unique mobile application identifier ("MAID") may be created by a mobile gateway, central trusted service manager, issuer, or an issuer trusted service manager during or prior to a provisioning of a mobile payment application. The mobile application identifier may be used to generate a mobile payment application key or unique derived key (UDK) that may be used to establish a secure session between the mobile gateway and the mobile payment application. Accordingly, the UDK may be used to establish a secure channel between mobile gateway and mobile payment application. The mobile gateway may then store the mobile application identifier in order to generate the UDK for each communication with the mobile payment application.

The mobile gateway may communicate with the mobile payment application for issuer updates as well as any other time to send a secure communication to the mobile payment application from any entity of the system described herein. Accordingly, the mobile gateway may communicate with the mobile payment application in order to create a secure session for any reason. For example, an issuer may send secure messages using a secure channel including account statements, account balances, or anything other parties may want to communicate through the secure channel.

The term "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

The term "payment processing network" may include a network that includes or operates at least one server computer used for payment processing. In some embodiments, the server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers. In some embodiments, the payment processing network may operate multiple server computers. In such embodiments, each server computer may be configured to process transaction for a given region or handles transactions of a specific type based on transaction data. The server computer may be referred to as a "payment processing server."

The payment processing network may include data processing subsystems, networks, and operations used to support and deliver authorization services, exception file services, and clearing and settlement services. An exemplary payment processing network may include VisaNet™. Networks that include VisaNet™ are able to process credit card transactions, debit card transactions, and other types of commercial transactions. VisaNet™, in particular, includes an integrated payments system (Integrated Payments system) which processes authorization requests and a Base II system, which performs clearing and settlement services. The payment processing network may use any suitable wired or wireless network, including the Internet.

The payment processing network may process transaction request messages and determine the appropriate destination (e.g., issuer computer) for the transaction request messages. The payment processing network may also handle and/or facilitate the clearing and settlement of transactions.

I. Exemplary Systems

As provided above, embodiments provide a central entity, such as an interconnectivity service hub, that can provision mobile payment applications on the mobile communication devices and personalize the mobile payment applications with consumer and account information. The provisioning of the mobile payment application on the mobile device may include providing (i.e. installing, loading) the mobile payment application on a secure element of the mobile device.

The personalization of the mobile payment application on the mobile communication device may include provisioning (i.e. providing) a payment account on the mobile payment application. The provisioning of the payment account on the mobile payment application may associate the account with the mobile payment application.

Referring now to FIG. 1, an exemplary interconnectivity service hub 102 and a central trusted server manager (TSM) 104 are provided as a part of an exemplary provisioning system 100. The provisioning system 100 may be in communication with a payment processing network 106 for provisioning of consumer accounts. In certain embodiments, the provisioning system 100 and the payment processing network 106 may be a part of (e.g. operated by) a same entity 110.

For simplicity of illustration, a certain number of components are shown is shown in FIG. 1. It is understood, however, that embodiments of the invention may include more than one of each component. In addition, some embodiments of the invention may include fewer than all of the components shown in FIG. 1. In addition, the components in FIG. 1 may communicate via any suitable communication medium (including the Internet), using any suitable communications protocol.

The provisioning system 100 may also be in communication with a mobile device 108 though a mobile gateway 109. The provisioning system 100 may provision and/or personalize a mobile payment application 114 on the mobile device 108, as will be discussed below in greater detail. The provisioning system 100 may also provision an account on (i.e. personalize) the mobile payment application 114 on the mobile device 108.

The provisioning of the mobile payment application on the mobile device and/or the provisioning of the account on the mobile payment application may include the provisioning system generating a script and sending the script (directly or indirectly) to the secure element of the mobile device. For example, the provisioning system may send the script directly to the secure element. In some embodiments, the provisioning system may send the script to an intermediary server computer, such as a server computer of a wallet provider, so that the intermediary server computer may then send the script to the secure element.

The mobile device 108 may be in any suitable form. For example, suitable mobile devices 108 can be hand-held and compact so that they can fit into a consumer's pocket (e.g., pocket-sized). The mobile device 108 can include a processor, memory, input devices, and output devices. The memory and input/output devices may be operatively coupled to the processor. Specific examples of mobile devices 108 include cellular or wireless phones, personal digital assistants (PDAs), pagers, portable computers, smart cards, and the like. An exemplary mobile device is illustrated in FIG. 7 and discussed below in greater detail in connection with FIG. 7.

Referring back to FIG. 1, a user 112 may wish to use the mobile device 108 to conduct payment transactions. A transaction initiated using the mobile device 108 may be processed by the payment processing network 106. However, prior to being able to use the mobile device 108 for payment transactions, the mobile payment application 114 may be provisioned and personalized on the mobile device 108. For increased security, the mobile payment application 114 may be provisioned on a secure element 116 of the mobile device 108.

The user 112 may request the mobile payment application 114 to be installed on the mobile device 108. For example, the user 112 may select (e.g. activate) a hyperlink on a browser of the mobile device 108, or the user 112 may receive a message (e.g. SMS, email message, etc.) with a hyperlink for installing the mobile payment application 114 on the device. One of ordinary skill in the art will appreciate that the user 112 may request the installation of the mobile payment application 114 in any suitable manner. Upon receiving the request, the mobile device 108 may contact the provisioning system 100 and request the provisioning system 100 to install and provision the mobile payment application 114 on the mobile device 108. The mobile device 108 and the provisioning system 100 may communicate through the mobile gateway 109.

The provisioning request from the mobile device 108 may be received at (or routed to) the interconnectivity service hub 102. Upon receiving the request, the interconnectivity service hub 102 may determine which secure element is associated with the mobile device 108. For example, the interconnectivity service hub 102 may query the mobile device 108 to identify the secure element 116. Upon identifying the secure element 116 on the mobile device 108, the interconnectivity service hub 102 may pass the information to the central TSM 104 and request the central TSM 104 to install and provision the mobile payment application 114 on the identified secure element 116 of the mobile device 108.

For provisioning of the mobile payment application 114, the central TSM 104 may contact the secure element TSM 118 and request the secure element TSM 118 to create a supplementary security domain (SSD) within the secure element 116 associated with the mobile device 108. The secure element TSM 118 may create the SSD and install the mobile payment application 114 on the secure element 116 of the mobile device 108. For example, the secure element TSM 118 may provision the mobile payment application 114 using a simple mode. In the simple mode, the secure element TSM 118 may send security domain owner information (including a temporary secure element key) back to the central TSM 104 such that central TSM 104 may directly access or manage the SSD and the provisioned mobile payment application 114 on the secure element 116. Exemplary security domain owner information may include keys and contents management privileges for a given SSD, Security Domain Image Number (SDIN), Issuer Identification Number (IIN), Key Set version for the secure channel keys and a potential Uniform Resource Identifier (URI) to the SSD owner backend system. Accordingly, the mobile payment application 114 may be installed by the secure element TSM 118 but controlled and managed by the central TSM 104 using the temporary secure element key. In embodiments of the present invention, the messages between the secure element TSM 118 and the central TSM 104 may pass through the interconnectivity service hub 102.

In other embodiments, the secure element TSM 118 may provision the mobile payment application 114 using a delegated or authorized mode. In the delegated or authorized mode, the secure element TSM 118 may send the security domain owner information (including the temporary secure element key) to the central TSM 104 without provisioning the mobile payment application 114. The central TSM 104 may provision the mobile payment application 114 directly by communicating with the secure element 116 using the received temporary secure element key.

After the mobile payment application 114 is provisioned on the secure element 116, the central TSM 104 may contact the secure element 116 to replace the temporary secure element key with a permanent key pair (e.g. secure element key pair). The permanent key pair may be a secure element key pair such that a first one of the secure element key pair is stored at the secure element 116 and the second one of the secure element key pair is stored at the central TSM 104. Using the secure element key pair, the central TSM 104 may personalize the mobile payment application as discussed below in greater detail in connection with FIG. 2. According to various embodiments, the secure element key pair may include identical keys (i.e. the first key of the secure element key pair may be identical to the second key of the secure element key pair). Alternatively, the secure element key pair may include a public/private key (i.e. the first key of the secure element key pair may be a public key and the second key of the secure element key pair may be a public key). The first key may be stored at the secure element 116 and the second key may be stored at the provisioning system 100. If the secure key pay is a public/private key, the public key may be stored at the secure element 116 while the private key may be stored at the provisioning system 100.

When the mobile payment application 114 is provisioned on the mobile device 108, the user 112 would require at least one account to be provisioned on the mobile payment application 114. The account(s) may be used to make payments for purchases made through the mobile payment application 114. The provisioning of the account requires the consumer, i.e. the user 112, to be authorized by the issuer computer 120 for provisioning the account. The issuer authorization indicates that the user 112 is confirmed to be an authorized owner of the account and that the account may be provisioned on a mobile device of the user 112.

The user 112 may communicate to the issuer computer 120 that the user 112 wishes to enroll/activate an account on the mobile device 108. The user 112 may provide personal identification information such as user name, date of birth, address, account number, expiration date associated with the account, etc. to the issuer computer 120. For example, the user 112 may contact the issuer computer 120 over the phone, via email or any other suitable medium to provide the personal identification information. In some embodiments, the user 112 may provide the information in person by going to a location of the issuer computer 120 or using a banking terminal (e.g. an automated teller machine (ATM)) of the issuer computer 120. The issuer computer 120 may perform a verification process, such as know your customer (KYC) verification process. If the verification process is successful, the issuer computer 120 may generate an account activation code for the account.

The issuer computer 120 is typically a system associated with an entity (e.g. a bank) which maintains financial accounts for the consumer and often issues a consumer payment device, such as a credit or debit card to the consumer. The issuer computer 120 may include a processor and a computer readable medium coupled to the processor, the computer readable medium comprising code, executable by the processor for performing the functionality described below.

The issuer computer 120 may generate the account activation code (AAC) using an account verification algorithm and/or a time based value. For example, the issuer computer may calculate a code portion value using a dynamic verification value (dCVV2) algorithm. In some exemplary embodiments, the issuer computer 120 may then form the account activation code (AAC) as follows:

AAC=TBN(4-digits)+code portion value(3-digits)=7-digit number where the TBN represents a time based value as a 4-digit numeric value. TBN may represent the number of hours since 0:00 am January 1 of the current year divided by the time window unit. The time window unit may represent the number of hours for which a generated account activation code may be valid. In other embodiments, the time based value could be any other suitable value including a dynamic number based on transactions, etc. In generating the account activation code, the issuer computer 120 may also use a truncated PAN and a card and/or account expiration date. Any other suitable account data elements or portions thereof may alternatively be used. The truncated PAN may be the rightmost 12 digits of the PAN (i.e. the PAN excluding the leftmost 4 digits).

In some embodiments, the account activation code may be a re-activation code that may be used to re-activate an account that was previously provisioned on the mobile device 108. For example, the account may be deleted, deactivated or suspended for any reason. The re-activation code may be used to re-activate the account on the mobile device 108 (i.e. on the mobile payment application 114). According to various embodiments, the account activation code is a type of cryptogram generated by the issuer computer 120 using a unique derived key (UDK) generated from a secret master key. For example, the issuer may generate the cryptogram according to chip authentication program (CAP) specification or dynamic passcode authentication (DPA) specification. The issuer computer 120 may communicate the account activation code to the user 112 in any suitable manner, such as over the phone, via email, SMS, printed mail, in person, etc.

As provided above, the issuer computer 120 may generate the UDK from a secret master key. According to various embodiments, the issuer computer 120 may share the secret master key with the payment processing network 106 or the provisioning system 100 (or the entity 110 managing both the payment processing network 106 and the provisioning system 100) at an earlier time. For example, the issuer computer 120 may share the secret master key before even receiving an account activation request from the user 112. Alternatively, the issuer computer 120 may share the secret master key with an account manager 122 of the payment processing network 106 or the provisioning system 100 immediately after providing the account activation code to the user 120. When the user 120 contacts the provisioning system 100 for provisioning the account on the mobile payment application 114, the user may provide the account activation code (along with other payment account information) to the provisioning network 100. The provisioning system 100 would already have the secret master key. Using the secret master key, the provisioning system 110 or the payment processing network 106 may provision the account on the mobile payment application 114 without contacting the issuer computer 120 during the provisioning of the account.

Specifically, the account manager 122 of the payment processing network 106 (or the provisioning system 100) may validate the account activation code by deriving the UDK using the secret master key shared by the issuer computer 120 at an earlier point in time. The secret master key may be shared with the payment processing network 106 by the issuer computer 120 or alternatively may be communicated to the payment processing network 106 through the provisioning system 100. In certain embodiments, the payment processing network 106 may generate two valid account activation code values based on a dCVV2 algorithm or any other suitable algorithm. A first account activation code value may be generated using the time based number (TBN) for the current time window and a second account activation code value using the TBN for the previous time window. As provided above, the time window may represent the number of hours for which a generated account activation code is valid. The payment processing network 106 may validate the account activation code (hence confirm that the account has been pre-authorized for provisioning by the issuer computer 120) when the account activation code value provided by the user 120 matches the first or second account activation code value generated by the payment processing network 106.

Upon validation, the payment processing network 106 may inform the provisioning system 100 that the account activation code has been validated. The provisioning system 100 may provision the account on the mobile payment application 114 by, for example, generating a script to be sent to the secure element 116 of the mobile device 108. The provisioning system 100 may send the script directly to the secure element 116. Alternatively, the provisioning system 100 may send the script to an intermediary server computer, such as a server computer of a wallet provider, such that the intermediary server computer may send the script to the secure element 116.

Accordingly, embodiments of the invention can be used to activate card accounts provisioned to NFC mobile devices without the need for issuing banks to interact with a payment processing network or a provisioning system during the provisioning and activation of the account. While FIG. 1 shows some of the entities for provisioning of a mobile payment application on a mobile device and activation of an account on the mobile payment application, FIG. 2 shows how the various entities may interact with one another.

Figure 2:
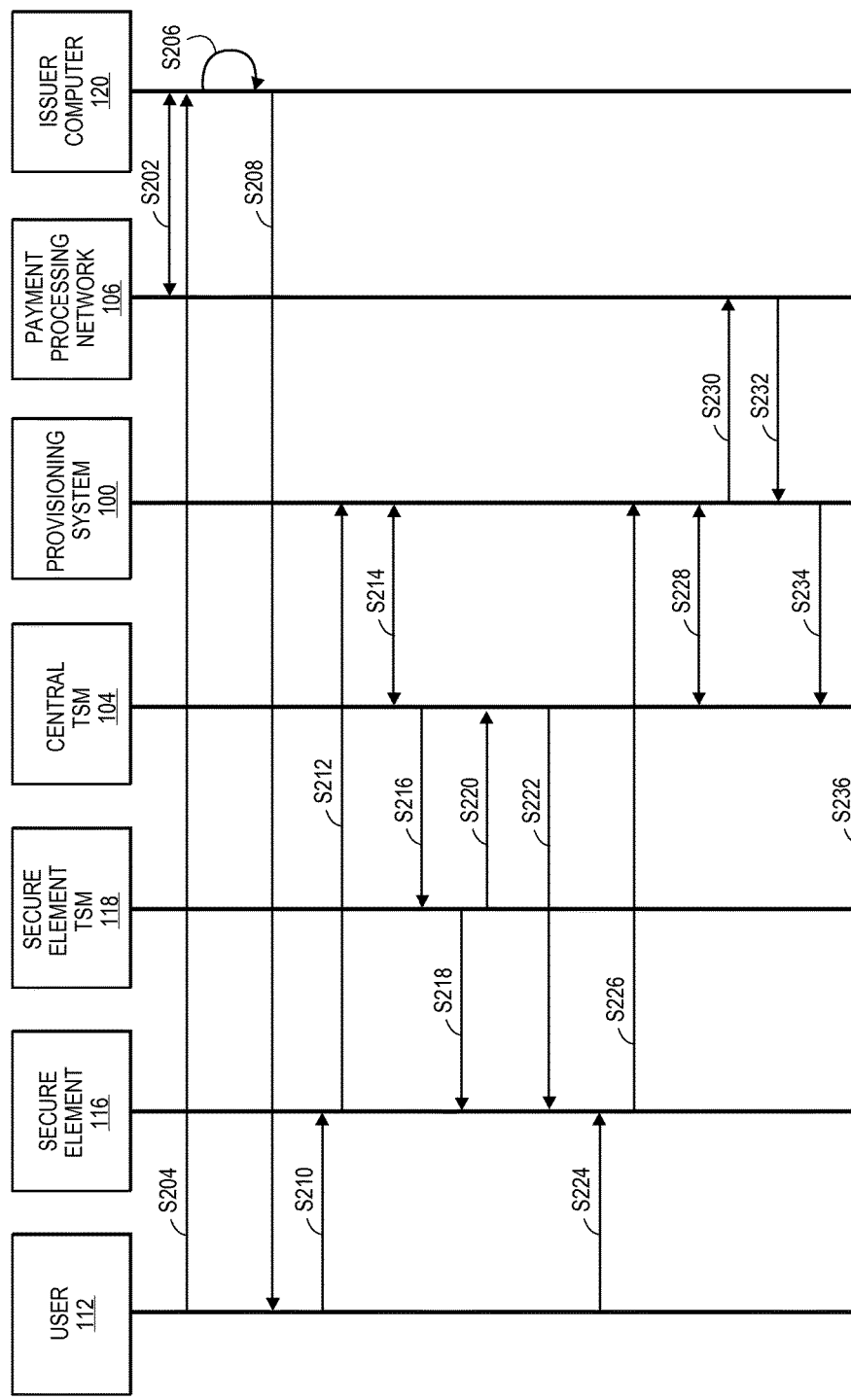
FIG. 2 shows an exemplary process flowchart for provisioning and personalizing a payment account application on a mobile device, according to an exemplary embodiment of the present invention.

FIG. 2 illustrates how components discussed above interact for provisioning and personalizing a payment account application on a mobile device. At a point in time before the provisioning and personalizing starts, the issuer computer 120 shares secret master keys with the payment processing network 106 (S202). To provision an account on the mobile device 108, the user 112 may contact the issuer operating the issuer computer 120 and provide personal identification and account information such as user name, address, date of birth, primary account number (PAN), card/account expiration date (CED), etc. to the issuer operating the issuer computer 120 (S204). The issuer computer 120 may process the received user information to verify whether the provided information is accurate. For example, the issuer computer 120 may perform know-your-customer verification for verifying the received user information. Based on the verification, the issuer computer 120 may authenticate the user 112 and confirm that the account can be provisioned on a mobile device (S206). The issuer computer 120 may then generate an account activation code and encrypt the account activation code using a unique derived key (UDK) that was derived from the shared master key. The issuer computer 120 may send the account activation code encrypted with UDK to the user 112 (S208) (e.g., to the user's mobile device).

Next, the provisioning of the mobile payment application on the mobile device is described. In order to provision a payment account on a mobile device, a mobile payment application first needs to be installed and provisioned on the mobile device. Thus, the user 112 may request that the mobile device 108 install the mobile payment application 114 (S210). For example, the user 112 may select (e.g. activate) a hyperlink on a browser of the mobile device 108, or the user 112 may receive a message (e.g. SMS, email message, etc.) with a hyperlink for installing the mobile payment application 114 on the device. The mobile payment application 114 may be a mobile banking application, a mobile banking applet, a mobile wallet, an e-wallet, etc. If the mobile device 108 determines that the mobile payment application 114 is not previously installed and/or provisioned on the mobile device 108, the mobile device 108 may request the provisioning system 100 to install and provision the mobile payment application 114 on the mobile device 108 (S212).

For security purposes, the mobile payment applications are preferably installed in a secure element of a mobile device. Accordingly, before provisioning the mobile payment application, the provisioning system needs to know which secure element is associated with the mobile device of the user. The provisioning system 100 may determine which secure element is associated with the mobile device 108 (S214), for example by querying the mobile device 108. Once the secure element is identified, the provisioning system 100 (e.g. the interconnectivity service hub 102) may request that the central TSM 104 provision the mobile payment application on the identified secure element.

The central TSM 104 of the provisioning system 100 may communicate with the TSM 118 of the identified secure element 116 and request that the secure element TSM 118 install a security domain and the mobile payment application 114 on the identified secure element 116 of the mobile device 108 (S216).

Upon receiving the instruction/request from the central TSM 104, the secure element TSM 118 may install the security domain and the mobile payment application 114 on the secure element 116 of the mobile device 108 using temporary keys (S218). The secure element TSM 118 may provide the temporary key to the central TSM 104 so that the central TSM 104 can directly manage the mobile payment application 114 (S220). For increased security, the central TSM 104 may replace the temporary key with a secure element key pair on the secure element 116 of the mobile device 108 (S222). The secure element key pair may be unique to the secure element 116 and only shared between the secure element 116 and the central TSM 104. For example, the secure element key pair may include two identical keys or a public/private key pair. A first one of the secure element key pair may be stored at the secure element 116 and a second one of the secure element key pair may be stored at the central TSM 104.

Next, the provisioning of the account on the mobile payment application (i.e. the personalization of the mobile payment application) is described. To provision the account on the mobile payment application 114, the user may provide account information, such as a primary account number (PAN), a card expiration date (CED), a card security code (e.g. a card verification value (CVV2)) and the account activation code (AAC) received from the issuer to the secure element 116 of the mobile device 108 (S224). For example, the user 112 may provide the information using an input device such as a keypad or a microphone of the mobile device. The secure element 116 may encrypt the received information (e.g. PAN, CED, CVV2, AAC) using the first one of the secure element key pair provided by the central TSM 104. The secure element 116 may send the encrypted account information to the provisioning system 100, for example, to the interconnectivity service hub 102 (S226).

The provisioning system 100 (e.g. the interconnectivity service hub 102) may receive the encrypted account information and may determine that the information has been encrypted using a first secure element key of the secure element key pair. The interconnectivity service hub 102 may retrieve the second secure element key of the secure element key pair from the central TSM 104 (S228). Using the second secure element key of the secure element key pair, the interconnectivity service hub 102 may decrypt the encrypted account information and obtain the PAN, CED, CVV2, AAC sent by the secure element 116 of the mobile device 108 (S228). If the issuer computer 120 shared the secret master keys with the provisioning system 100, then the interconnectivity service hub 102 may validate the account activation code using the secret master keys. For example, the interconnectivity service hub 102 may derive, from the secret master key, the unique derived key (UDK) that was used to generate the account activation code and validate the account activation code using the UDK.

Alternatively, if the issuer computer 120 shared the secret master keys with the payment processing network 106, the interconnectivity service hub 102 may send the decrypted account activation code to the payment processing network 106 for validation (S230). The payment processing network 106 may derive, from the secret master key, the unique derived key (UDK) that was used to generate the account activation code and validate the account activation code using the UDK.

When the provisioning system 100 identifies that the information is encrypted using the secure element key pair, and is able to decrypt the information using the second secure element key, the provisioning system may validate and/or confirm that the information is sent from a recognized secure element. Accordingly, the use of the secure element key pair between the secure element (e.g. mobile device) and the provisioning system helps to validate that the information is sent from a correct mobile device. That is, an identity of the mobile device requesting the provisioning of the account (e.g. the personalization of the mobile payment application) may be validated using the secure element key pair.

The payment processing network 106 may send the validation results back to the interconnectivity service hub 102 (S232).

The validation of the account activation code either by the provisioning system 100 or by the payment processing network 106 confirms that (1) the user 112 has been verified by the issuer computer 120 and (2) the account is pre-authorized by the issuer computer 120 to be provisioned on the mobile device 108. Once the account activation code is validated, the interconnectivity service hub 102 may generate a script to be sent to the mobile device 108 to provisioning the account information on the mobile payment application 114. The script may personalize the mobile payment application 114 on the mobile device 108. The interconnectivity service hub 102 may provide the script to the central TSM 104 (S234). The central TSM 104 may send the script to the secure element 116 of the mobile device 108, so that the secure element 116 can provision the account on the mobile payment application 114 (S236). The central TSM 104 may send the script directly to the secure element 116. Alternatively, the central TSM 104 may send the script to an intermediary server computer, such as a server computer of a wallet provider, which may send the script to the secure element 116.

As such, embodiments provision and personalize a mobile payment application on a mobile device without communicating with the issuer during the provisioning process. In addition, the personal account information provided to the mobile device by the user may be encrypted using a secret key pair unique to the secure element and the central TSM. Thus, the sensitive information is not shared with third party TSMs and is protected from fraudsters. The secret key pair shared between the central TSM and the secure element is used to encrypt the account information as well as the account activation code previously generated by the issuer. Since the central TSM is the only other party in possession of the secret key pair, a third party cannot acquire the sensitive information. When the account activation code is decrypted at the provisioning system using the secret key pair stored at the central TSM, the verification of the account activation code is completed without contacting the issuer. The verification of the account activation code is discussed below.

Figure 3:
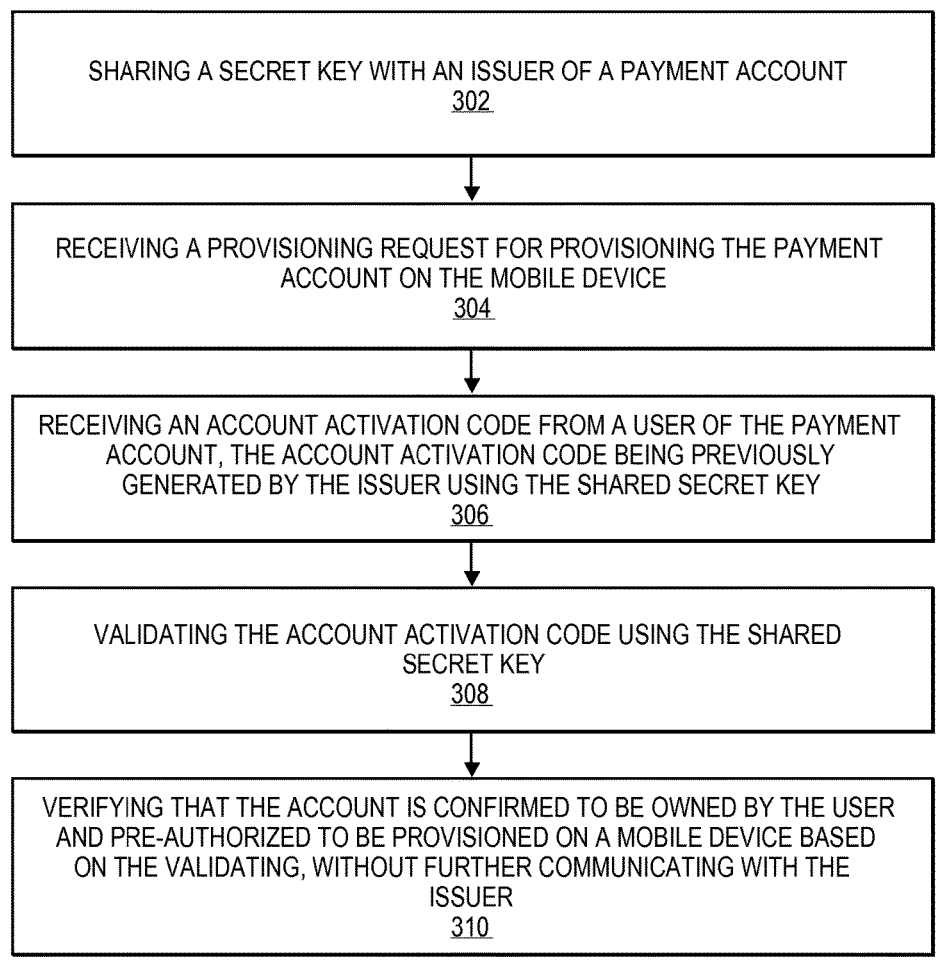
FIG. 3 shows an exemplary process flowchart for a server computer to verify a user of a payment account without interacting with the issuer during provisioning of the payment account on a mobile device, according to an exemplary embodiment of the present invention.

FIG. 3 shows an exemplary process flowchart 300 for a server computer to verify a user of a payment account without interacting with the issuer during provisioning of the payment account on a mobile device. The process starts with the server computer sharing a secret key with an issuer of a payment account (step 302). For example, the issuer may send a secret master key to the server computer. The issuer may use the same secret key, directly or indirectly, in generating an account activation code for the user. The secret key exchange occurs prior to the provisioning process of the payment account.

At a later point in time, the server computer receives a provisioning request to provision the payment account on a mobile device (step 304). The provisioning of the payment account on the mobile device after receiving the provisioning request is discussed below in connection with FIG. 4. However, before the account can be provisioned on the mobile device, the server computer may need to verify the user and determine whether the account has been pre-approved by the issuer for being provisioned on a mobile device.

The server computer may also receive an account activation code for the account (step 306). As provided above, the account activation code may be previously generated by the issuer of the account using the shared secret key. The server computer may validate the account activation code using the shared secret key without communicating with the issuer of the account during the provisioning of the account on the mobile device (step 308). Specifically, the server computer may recognize that the account activation code is generated using the shared secret key (or a key generated from the shared secret key). When the server computer validates the account activation code, the server computer may verify that the account is pre-authorized by the issuer to be provisioned on the mobile device (step 310).

The provisioning of the payment account on the mobile device after receiving the provisioning request will be described next in connection with FIG. 4.

FIG. 4 shows an exemplary process flowchart 400 for a server computer to provision/personalize an account on a mobile device using a secure element key pair. The server computer may receive a provisioning request to provisioning an account on a mobile device (step 402). The provisioning request may include encrypted payment account information. The encrypted payment account information may be encrypted using a first secure element key associated with a security domain of a secure element provided on the mobile device. The first secure element key may be one of a secure element key pair, where the secure element key pair may be unique to the secure element. In certain embodiments, the first secure element key may be provided to the secure element by the server computer. The server computer may have the second secure element key of the secure element key pair.

The server computer may decrypt the encrypted payment account information using the second secure element key of the secure element key pair (step 404). Accordingly, the first secure element key of the secure element key pair may be stored at the secure element of the mobile device, and the second secure element key of the secure element key pair may be stored at the server computer. The decrypted account information may include a primary account number (PAN), a card expiration date (CED), a card security code (e.g. a card verification value (CVV2)) and the account activation code (AAC). If the information is decrypted using the second secure element key, the server computer may infer that the information is sent from a recognized secure element which is provided with the first secure element key. Accordingly, the use of the secure element key pair between the secure element (e.g. mobile device) and the server computer helps to validate that the information is sent from a correct mobile device. Thus, the server computer may validate the mobile device using the second secure element key of the secure element key pair (step 406). Upon validation, the server computer may provision the account on the mobile device using the decrypted payment account information (step 408).

Figure 5:
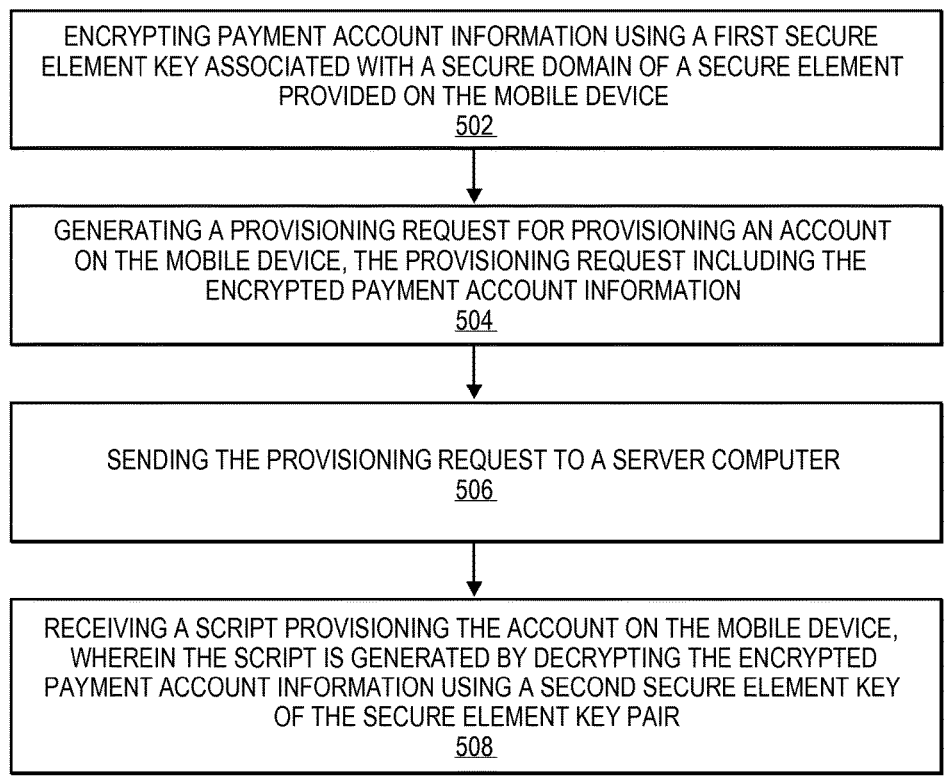
FIG. 5 shows an exemplary process flowchart for a mobile device to request provisioning of a payment account on a mobile device, according to an exemplary embodiment of the present invention.

Accordingly, FIG. 4 illustrates the steps performed by a server computer, such as a provisioning system, in response to receiving a provisioning request for provisioning of the payment account on the mobile device. The server computer receives the request from the mobile device. FIG. 5 illustrates corresponding steps performed by the mobile device for requesting the provisioning and, subsequently, provisioning the payment account on the mobile device.

FIG. 5 shows an exemplary process flowchart 500 for a mobile device to request provisioning of a payment account on the mobile device. The process starts with the mobile device encrypting payment account information using a first secure element key associated with a security domain of a secure element provided on the mobile device (step 502). The payment account information may include a primary account number (PAN), a card expiration date (CED), a card security code (e.g. a card verification value (CVV2)) and the account activation code (AAC). The first secure element key may be one of a secure element key pair. The secure element key pair may be unique to the secure element. In certain embodiments, the first secure element key may be provided to the secure element by a server computer. The server computer may have the second secure element key of the secure element key pair.

The mobile device may generate a provisioning request for provisioning an account on the mobile device (step 504). The provisioning request may include the encrypted payment account information. The mobile device may send the provisioning request to a server computer (step 506).

The server computer may decrypt and verify the account information as discussed above in connection with FIG. 4. Once the information is verified at the server computer, the mobile device may receive, from the server computer, a script provisioning the account on the mobile device (step 508). The script may have been generated by decrypting the encrypted payment account information using a second secure element key of the secure element key pair. Thus, the first secure element key of the secure element key pair may be stored at the secure element of the mobile device, and the second secure element key of the secure element key pair may be stored at the server computer. Using the script, the account may be provisioned on the mobile device.

IV. Technical Benefits

Embodiments of the present invention provide a number of advantages and technical benefits. For example, embodiments authenticate an issuer account provisioning approval (i.e. the account activation code generated by the issuer) in distributed systems without direct communication between a provisioning service and the issuer. Additionally, provides more secure provisioning system through use of secure element key in passing sensitive information that allows identification of mobile device.

Embodiments of the present invention provide increased fraud detection through the use of a secret key pair between the secure element of the mobile device and the central TSM of the provisioning service. Typically, personal account information was passed from the mobile device to the provisioning service using third party TSMs and keys provided by those TSMs. Accordingly, the data traveled through third party TSMs before reaching the provisioning system. In addition, the provisioning system was not the only entity having control over the mobile payment application provisioned on the secure element.

By using the secure element key pair to encrypt the provisioning request information (e.g. personal account information), the provisioning service is able to protect the information from malicious third parties as well as validate the identity of the requesting mobile device using the corresponding keys stored at the provisioning service. As such, the provisioning service is better protected from spoofing attacks where a device pretends to be a consumer device they are not by using public keys available to any device. Accordingly, devices may not pretend to be a consumer device because they do not have access to the secure element (and thus the secure element key pair) associated with the device.

Embodiments of the present invention solve the deficiency in the prior art by encrypting personal account data (including the primary account number) at the secure element of the mobile device using a secure element key pair provided to the secure element by the central TSM of the provisioning system. According to embodiments of the present application, the account information may be provided by the user to the mobile device and encrypted using the secure element key pair. That is, the account information need not to be provided to or stored at an issuer computer prior to being provisioned on the mobile device. This ensures greater security from fraud by reducing the number of parties receiving the sensitive information.

Embodiments of the present invention also provide the capability to validate the consumer during a provisioning of an account on a mobile device, without communicating with the issuer. This ensures increased efficiency in provisioning an account on a mobile device.

V. Exemplary Computer System

Figure 6:
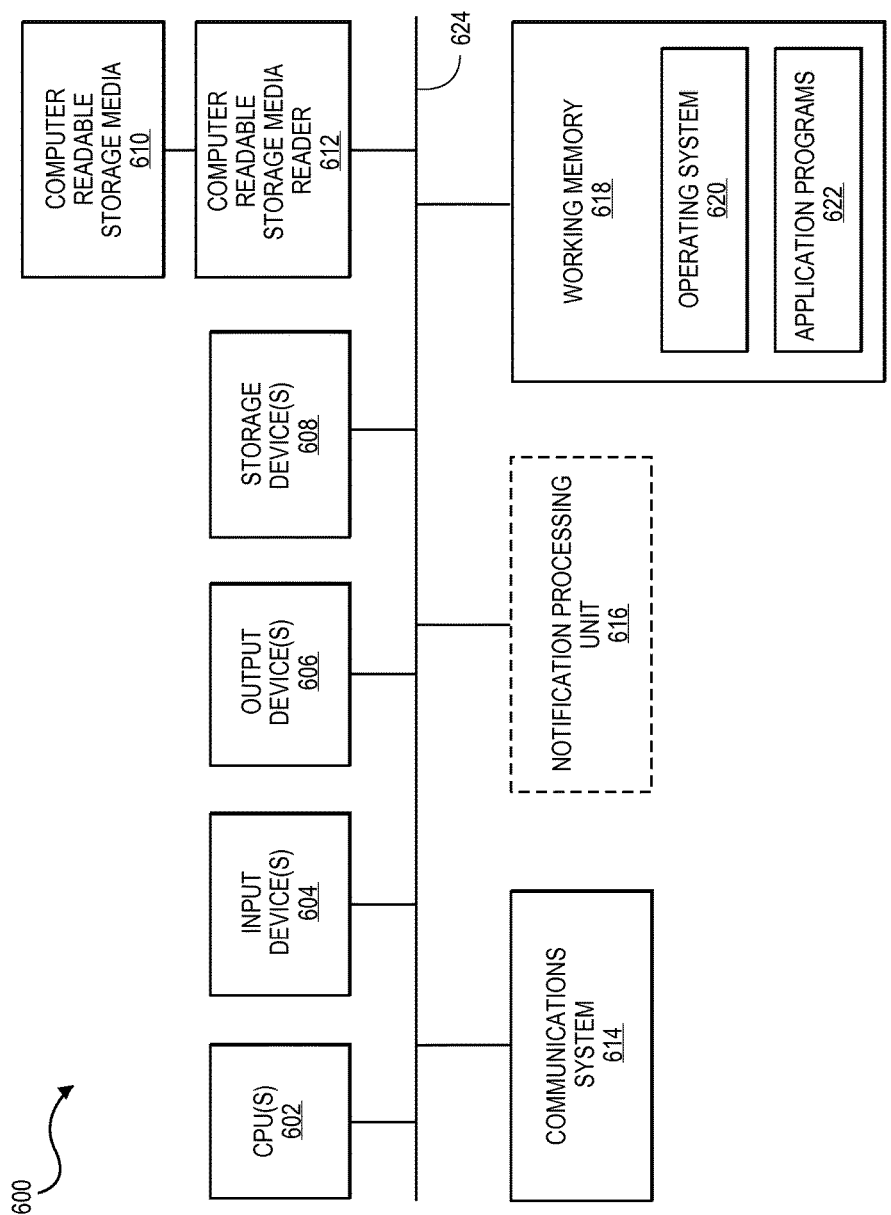
FIG. 6 illustrates an exemplary computer apparatus for use with the system of FIG. 1.

Referring now to FIG. 6, an exemplary computer system 200 according to one embodiment of the present invention is illustrated. The exemplary computer system 200 can be utilized to implement the hub 14 of FIG. 1 among various other embodiments of the present invention may be implemented. The system 200 may be used to implement any of the computer systems described above (e.g., client computer, a server computer at the card association, a server computer at the issuer, a computer apparatus at the merchant, etc.). The computer system 200 is shown comprising hardware elements that may be electrically coupled via a bus 224. The hardware elements may include one or more central processing units (CPUs) 202, one or more input devices 204 (e.g., a mouse, a keyboard, etc.), and one or more output devices 206 (e.g., a display device, a printer, etc.). The computer system 200 may also include one or more storage devices 208. By way of example, the storage device(s) 208 can include devices such as disk drives, optical storage devices, solid-state storage device such as a random access memory ("RAM") and/or a read-only memory ("ROM"), which can be programmable, flash-updateable and/or the like.

The computer system 200 may additionally include a computer-readable storage media reader 212, a communications system 214 and working memory 218, which may include RAM and ROM devices as described above. The communications systems can include, for example, a modem, a network card (wireless or wired), an infra-red communication device, etc. In some embodiments, the computer system 200 can also include a processing acceleration unit 216, such as a digital signal processor (DSP), a special-purpose processor, and/or the like.

The computer-readable storage media reader 212 can further be connected to a computer-readable storage medium 210, together (and, optionally, in combination with storage device(s) 208) comprehensively representing remote, local, fixed, and/or removable storage devices plus storage media for temporarily and/or more permanently containing, storing, transmitting, and retrieving computer-readable information. The communications system 214 can permit data to be exchanged with the network and/or any other computer described above with respect to the system 200.

The computer system 200 may also comprise software elements, shown to be located within a working memory 218, including an operating system 220 and/or application programs 222 comprising code, such as a client application, Web browser, mid-tier application, RDBMS, etc. It may be appreciated that alternate embodiments of a computer system 200 can have numerous variations from that described above. For example, customized hardware might also be used and/or particular elements might be implemented in hardware, software (including portable software, such as applets), or both. Further, connection to other computing devices such as network input/output devices may be employed.

Storage media and computer-readable media for containing code, or portions of code, can include any appropriate media known or used in the art, including storage media and communication media, such as but not limited to volatile and non-volatile, removable and non-removable media implemented in any method or technology for storage and/or transmission of information such as computer-readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by the computer. Based on the disclosure and teachings provided herein, a person of ordinary skill in the art may appreciate other ways and/or methods to implement the various embodiments.

Referring now to FIG. 7, a functional block diagram of a mobile communication device 50 according to an embodiment of the present invention is illustrated. As shown in FIG. 5, the mobile communication device 50 may be in the form of cellular phone, having a display 50(e) and input elements 50(i) to allow a user to input information into the device 50 (e.g., keyboard), memory 50(b). The mobile communication device 50 can also include a processor 50(k) (e.g., a microprocessor) for processing the functions of the mobile communication device 50, at least one antenna 50(c) for wireless data transfer, a microphone 50(d) to allow the user to transmit his/her voice through the mobile communication device 50, and speaker 50(f) to allow the user to hear voice communication, music, etc. In addition, the mobile communication device 50 may include one or more interfaces in addition to antenna 50(c), e.g., a wireless interface coupled to an antenna. The communications interfaces 50(g) can provide a near-field communication interface (e.g., contactless interface, Bluetooth, optical interface, etc.) and/or wireless communications interfaces capable of communicating through a cellular network, such as GSM, or through WiFi, such as with a wireless local area network (WLAN). Accordingly, the mobile communication device 50 may be capable of transmitting and receiving information wirelessly through both short range, radio frequency (RF) and cellular and WiFi connections.

Additionally, the mobile communication device 50 can be capable of communicating with a global positioning system (GPS) in order to determine to location of the mobile communication device. In the embodiment shown in FIG. 5, antenna 50(c) may comprise a cellular antenna (e.g., for sending and receiving cellular voice and data communication, such as through a network such as a 3G or 4G network), and interfaces 50(g) may comprise one or more local communication. In other embodiments contemplated herein, communication with the mobile communication device 50 may be conducted with a single antenna configured for multiple purposes (e.g., cellular, transactions, etc.), or with further interfaces (e.g., 3, 4, or more separate interfaces).

The mobile communication device 50 can also include a computer readable medium 50(a) coupled to the processor 50(k), which stores application programs and other computer code instructions for operating the device, such as an operating system (OS) 50(a)-4. In an embodiment of the present invention, the computer readable medium 50(a) can include a mobile payment application 50(a)-1. The mobile payment application 50(a)-1 can be accessed only when a secure element 50(a)-2 of the computer readable medium 50(a) is accessed, such as through communication with a trusted service manager. In addition, the application can include a customizable user interface (UI), which can be determined by the user's preferences through application level programming. These preferences can be securely communicated through the antenna element 50(c) to an issuer of the account stored in the application. The application can be used to securely complete contactless payments through account stored on the mobile communication device and/or in a mobile wallet associated with the user of the mobile communication device 50(k).

Referring again to FIG. 7, the computer readable medium 50(a) can also include a secure element (SE) 50(a)-2, which can be an encrypted memory element of the computer readable medium 50(a). The SE 50(a)-2 can be accessed through an SE Key Verification Engine 50(a)-3, which can also be located in the computer readable medium 50(a). The SE Key Verification Engine 50(a)-3 can receive keys from contactless communication, e.g., antenna 30(c) and either grant or deny access to the SE 50(a)-2.

The computer readable medium 50(a) on the mobile communication device 30 can also include additional mobile applications 50(a)-5, which can be downloaded by a user of the mobile communication device 50(k). The mobile communication device 50 can additionally include an integrated camera 50(j), capable of capturing images and/or video. In certain embodiments, the mobile communication device 50 may include a non-transitory computer readable storage medium, e.g., memory 50(b), for storing data saved on the mobile communication device 50(k).

The above description is illustrative and is not restrictive. Many variations of the invention may become apparent to those skilled in the art upon review of the disclosure. The scope of the invention may, therefore, be determined not with reference to the above description, but instead may be determined with reference to the pending claims along with their full scope or equivalents.

It may be understood that the present invention as described above can be implemented in the form of control logic using computer software in a modular or integrated manner. Based on the disclosure and teachings provided herein, a person of ordinary skill in the art may know and appreciate other ways and/or methods to implement the present invention using hardware and a combination of hardware and software.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

One or more features from any embodiment may be combined with one or more features of any other embodiment without departing from the scope of the invention.

A recitation of "a", "an" or "the" is intended to mean "one or more" unless specifically indicated to the contrary.

What is claimed is:

1. A method comprising:
   receiving, by a server computer from a mobile device, a provisioning request message for provisioning an account on the mobile device, the provisioning request message including encrypted payment account information, the encrypted payment account information encrypted using a first secure element key associated with a security domain of a secure element provided on the mobile device, the first secure element key being one of a secure element key pair, and the secure element key pair being unique to the secure element;
   decrypting, by the server computer, the encrypted payment account information using a second secure element key of the secure element key pair thereby generating decrypted payment account information;
   retrieving, by the server computer, a primary account number and an account activation code generated by an issuer of the account from the decrypted payment account information received from the mobile device without communicating with the issuer of the account during the provisioning of the account on the mobile device, wherein the primary account number and the account activation code are retrieved prior to being validated;
   validating, by the server computer, the primary account number and the account activation code without communicating with the issuer of the account during the provisioning of the account on the mobile device;
   validating, by the server computer, the mobile device using the second secure element key of the secure element key pair; and
   provisioning, by the server computer, the account on the mobile device using the primary account number in the decrypted payment account information.

2. The method of claim 1, further comprising, prior to provisioning the account on the mobile device:
   provisioning, by the server computer, a mobile payment application on the secure element of the mobile device using a trusted service manager of the secure element; and
   providing, by the server computer, the first secure element key of the secure element key pair to the secure element of the mobile device.

3. The method of claim 2, wherein the account is provisioned on the mobile payment application.

4. The method of claim 1, wherein the validating further comprises:
   determining that the second secure element key is other one of the secure element key pair; and
   identifying the secure element based on determining that the second secure element key is the other one of the secure element key pair.

5. The method of claim 1, wherein the first secure element key of the secure element key pair is stored at the secure element of the mobile device and the second secure element key of the secure element key pair is stored at the server computer.

6. The method of claim 1, wherein the encrypted payment account information is generated by encrypting one or more of the primary account number, the account activation code, a card verification value and a card expiration date.

7. The method of claim 1, further comprising:
   sharing, by the server computer, a secret key with the issuer of the account prior to receiving the provisioning request message,
   wherein the account activation code is generated by the issuer of the account using the shared secret key, wherein the account activation code is validated by the server computer using the shared secret key; and
   verifying that the account is pre-authorized by the issuer to be provisioned on the mobile device based on the validating.

8. A server computer comprising:
   a processor; and
   a non-transitory computer readable medium coupled to the processor, the non-transitory computer readable medium comprising code, that when executed by the processor, causes the processor to:
      receive, from a mobile device, a provisioning request message for provisioning an account on the mobile device, the provisioning request message including encrypted payment account information, the encrypted payment account information encrypted using a first secure element key associated with a security domain of a secure element provided on the mobile device, the first secure element key being one of a secure element key pair, and the secure element key pair being unique to the secure element;
      decrypt the encrypted payment account information using a second secure element key of the secure element key pair thereby generating decrypted payment account information;
      retrieve a primary account number and an account activation code generated by an issuer of the account from the decrypted payment account information received from the mobile device without communicating with the issuer of the account during the provisioning of the account on the mobile device, wherein the primary account number and the account activation code are retrieved prior to being validated;

validate the primary account number and the account activation code without communicating with the issuer of the account during the provisioning of the account on the mobile device;

validate the mobile device using the second secure element key of the secure element key pair; and provision the account on the mobile device using the primary account number in the decrypted payment account information.

9. The server computer of claim 8, wherein the code, when executed by the processor, further causes the processor to:

provision a mobile payment application on the secure element of the mobile device using a trusted service manager of the secure element; and provide the first secure element key of the secure element key pair to the secure element of the mobile device.

10. The server computer of claim 9, wherein the account is provisioned on the mobile payment application.

11. The server computer of claim 8, wherein the code, when executed by the processor to validate the mobile device, further causes the processor to:

determine that the second secure element key is other one of the secure element key pair; and identify the secure element based on determining that the second secure element key is the other one of the secure element key pair.

12. The server computer of claim 8, wherein the first secure element key of the secure element key pair is stored at the secure element of the mobile device and the second secure element key of the secure element key pair is stored at the server computer.

13. The server computer of claim 8, wherein the encrypted payment account information is generated by encrypting one or more of the primary account number, the account activation code, a card verification value and a card expiration date.

14. The server computer of claim 8, wherein the code, when executed by the processor, further causes the processor to:

share a secret key with the issuer of the account prior to receiving the provisioning request message, wherein the account activation code is generated by the issuer of the account using the shared secret key, wherein the account activation code is validated by the server computer using the shared secret key, and verify that the account is pre-authorized by the issuer to be provisioned on the mobile device based on the validating.

15. A method comprising:

encrypting, by a mobile device, payment account information and an account activation code generated by an issuer of an account using a first secure element key associated with a security domain of a secure element provided on the mobile device, the first secure element key being one of a secure element key pair, and the secure element key pair being unique to the secure element;

generating, by the mobile device, a provisioning request message for provisioning the account on the mobile device, the provisioning request message including the encrypted payment account information;

sending, by the mobile device, the provisioning request message to a server computer without communicating the provisioning request message to the issuer of the account during the provisioning of the account on the mobile device; and receiving, by the mobile device, a script provisioning the account on the mobile device, wherein the script is generated by the server computer upon the server computer decrypting the encrypted payment account information using a second secure element key of the secure element key pair, validating the payment account information and the account activation code without communicating with the issuer of the account during the provisioning of the account on the mobile device, and validating the mobile device using the second secure element key of the secure element key pair.

16. The method of claim 15, wherein the first secure element key of the secure element key pair is stored at the secure element of the mobile device and the second secure element key of the secure element key pair is stored at the server computer.

17. The method of claim 15, wherein the account activation code is generated by the issuer using a shared secret key and validated by the server computer using the shared secret key, such that the issuer of the account and the server computer shared the shared secret key prior to generation of the account activation code.

* * * * *